(12) United States Patent
Zhu et al.

(10) Patent No.: US 12,003,803 B2
(45) Date of Patent: Jun. 4, 2024

(54) CONTENT DELIVERY METHOD AND SYSTEM THROUGH IN-VEHICLE NETWORK BASED ON REGIONAL CONTENT POPULARITY

(71) Applicant: NANJING UNIVERSITY OF POSTS AND TELECOMMUNICATIONS, Nanjing (CN)

(72) Inventors: Qi Zhu, Nanjing (CN); Shaoqi Yue, Nanjing (CN)

(73) Assignee: NANJING UNIVERSITY OF POSTS AND TELECOMMUNICATIONS, Nanjing (CN)

( * ) Notice: Subject to any disclaimer, the term of this patent is extended or adjusted under 35 U.S.C. 154(b) by 19 days.

(21) Appl. No.: 17/985,526

(22) Filed: Nov. 11, 2022

(65) Prior Publication Data

US 2023/0156262 A1  May 18, 2023

Related U.S. Application Data

(63) Continuation of application No. PCT/CN2022/107285, filed on Jul. 22, 2022.

(30) Foreign Application Priority Data

Nov. 11, 2021  (CN) .......................... 202111332459.8

(51) Int. Cl.
*H04N 21/414* (2011.01)
*H04N 21/433* (2011.01)
*H04N 21/442* (2011.01)

(52) U.S. Cl.
CPC ... *H04N 21/41422* (2013.01); *H04N 21/4331* (2013.01); *H04N 21/44222* (2013.01)

(58) Field of Classification Search
None
See application file for complete search history.

(56) References Cited

U.S. PATENT DOCUMENTS

| | | | | |
|---|---|---|---|---|
| 7,028,096 B1 * | 4/2006 | Lee | ................. | H04N 21/23106 |
| | | | | 725/145 |
| 7,404,201 B2 * | 7/2008 | Takeuchi | ........... | H04N 7/17336 |
| | | | | 725/86 |

(Continued)

FOREIGN PATENT DOCUMENTS

| | | |
|---|---|---|
| CN | 104253855 A | 12/2014 |
| CN | 110198341 A | 9/2019 |

(Continued)

*Primary Examiner* — An Son P Huynh
(74) *Attorney, Agent, or Firm* — Nitin Kaushik

(57) ABSTRACT

The present disclosure discloses a content delivery method and system through an in-vehicle network based on regional content popularity, and in particular relates to the technical field of in-vehicle networks. For a content library corresponding to a target region and each target vehicle in the target region, each target vehicle responds to content objects in the content library. Based on each content object in the content library corresponding to the target region and a data eigenvalue of a preset data type corresponding to each content object, for each target vehicle in the target region that receives a data screening request, in response to the data screening request, content objects that match the data screening request are obtained and scheduled. A set of data screening requests responded to by each target vehicle is obtained by constructing a utility function.

6 Claims, 3 Drawing Sheets

1. Start
2. Data screening request
3. Whether the current target vehicle satisfies all users' utility and maximization
4. Whether the current target vehicle has cached data screening requests
5. The current target vehicle responds to the data screening request
6. End
7. Yes
8. No

(56) References Cited

U.S. PATENT DOCUMENTS

| | | | | |
|---|---|---|---|---|
| 2012/0137336 A1* | 5/2012 | Applegate | ............ | H04N 21/252 |
| | | | | 725/95 |
| 2013/0073221 A1* | 3/2013 | Attinger | ................ | G16C 20/20 |
| | | | | 702/30 |
| 2014/0280679 A1* | 9/2014 | Dey | ...................... | H04L 67/568 |
| | | | | 709/213 |
| 2019/0141495 A1* | 5/2019 | Jha | ...................... | H04W 40/026 |

FOREIGN PATENT DOCUMENTS

| | | | |
|---|---|---|---|
| CN | 111866952 A | 10/2020 | |
| CN | 113905354 A | 1/2022 | |
| WO | WO2020160007 A1 | 8/2020 | |

\* cited by examiner

1. Start  2. Data screening request
3. Whether the current target vehicle satisfies all users' utility and maximization
4. Whether the current target vehicle has cached data screening requests
5. The current target vehicle responds to the data screening request
6. End  7. Yes  8. No

CONTENT DELIVERY METHOD AND SYSTEM THROUGH IN-VEHICLE NETWORK BASED ON REGIONAL CONTENT POPULARITY

CROSS-REFERENCE TO RELATED APPLICATIONS

The application claims priority to Chinese patent application No. 202111332459.8, filed on Nov. 11, 2021, the entire contents of which are incorporated herein by reference.

TECHNICAL FIELD

The present disclosure relates to the technical field of in-vehicle networks, in particular to a content delivery method and system through an in-vehicle network based on regional content popularity.

BACKGROUND

In recent years, with rapid development of intelligent transportation systems, various in-vehicle applications, e.g., road safety, intelligent transportation, in-vehicle entertainment, and driverless applications, have appeared in people's lives. With the increase of the number of vehicles, the communication load of an in-vehicle network increases sharply. Moreover, the contents requested by vehicles need to be transmitted from a content service center, which brings about a long request delay and results in lower user experience quality. In order to reduce the communication load of an in-vehicle network and reduce the request delay of vehicles, caching technology has been introduced into the in-vehicle network.

In the application of the caching technology to the existing in-vehicle networks, based on the cached content at each node in a network, a user may directly obtain the required content from surrounding vehicle nodes, such that the communication link through which the requesting vehicle obtains the contents may be effectively shortened, but the redundancy of the contents in the network increases, and the requirements on the memory size and traffic size required by the network and a content server are higher.

The existing caching strategies mainly include Leave Copy Every (LCE), Caching with Probability, and Leave Copy Down (LCD). LCE means that the content will be cached by every network node through which the content passes. Caching with Probability means that a network node will cache the content passing through the node with a certain fixed probability. LCD is to cache the content at the node next to a content source node. These caching strategies do not consider the content preferences of users around cache nodes, which may result in the case that a user request may not be responded to.

SUMMARY

The objective of the present disclosure is to provide a content delivery method and system through an in-vehicle network based on regional content popularity to solve the problems in the prior art.

To achieve the above objective, the present disclosure provides the following technical solutions:

A first aspect of the present disclosure provides

A second aspect of the present disclosure provides a content delivery system through an in-vehicle network based on regional content popularity, including:

A third aspect of the present disclosure provides a computer-readable medium for storing software, the software including instructions executable by one or more computers, and the instructions, when executed by the one or more computers, performing the steps of the content delivery method through an in-vehicle network based on regional content popularity.

Using the above technical solutions, the content delivery method through an in-vehicle network based on regional content popularity provided by the present disclosure has the following technical effects compared with the prior art:

In order to further improve the performance of the system, in a caching process, the regional popularity is introduced, the content popularity of different regions is considered, and the cache ratio and the similarity of regional popularity of different content categories in a target vehicle are expressed by cross-entropy. By maximizing the similarity, the caching strategy of the target vehicle is optimized, and the nodes in the region cache the content with higher content popularity, so that the success rate that a user obtains the requested content from the surrounding nodes is higher, and the cache utilization of the target vehicle is also improved.

Moreover, in order to improve the content transmission quality of the target vehicle, the present disclosure constructs a utility function of data screening requests responded to by a target vehicle based on the delay and the success rate, and obtains a set of data screening requests responded to by the target vehicle by maximizing the utility function, such that a compromise is achieved between the request success rate and the request delay.

DETAILED DESCRIPTION OF THE EMBODIMENTS

Figure 1:
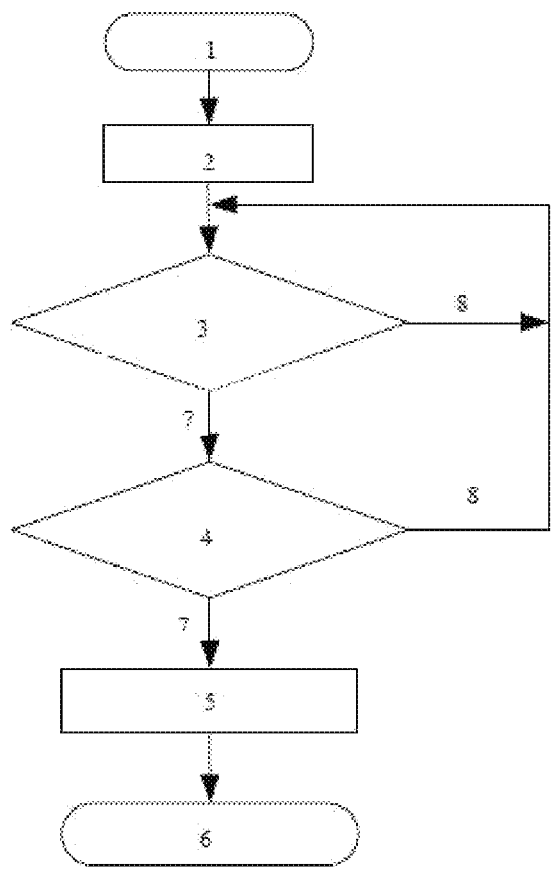
FIG. 1 shows a schematic flowchart of a content delivery method through an in-vehicle network according to an exemplary example of the present disclosure.

With reference to the schematic flowchart of the exemplary example of the present disclosure in FIG. 1, the present disclosure provides a content delivery method through an in-vehicle network based on regional content popularity. Based on each content object in a content library corresponding to a target region and the data eigenvalue of a preset data type corresponding to each content object, for each target vehicle in the target region that receives a data screening request, in response to the data screening request, the following steps are performed to obtain and schedule content objects that match the data screening request:

Step A: The data eigenvalue of the specified preset data type of each content object in the content library corresponding to the target region is extracted. The content category of each preset type corresponding to each content object is obtained based on the data eigenvalue. For each target vehicle, based on the content category and the data eigenvalue of the content object, each content category corresponding to all content objects is obtained. The cache ratio of all content objects corresponding to each target vehicle under each content category is further obtained. Then, the content objects contained in each content category are input into the target vehicle as the cached content of the target vehicle according to the cache ratio, that is, each target vehicle obtains a cached content library containing each content object. Then, step B is performed.

Step B: For each target vehicle that receives the data screening request, based on the interaction between the target vehicle and other target vehicles within a preset communication range, the delay that the target vehicle responds to the data screening request within the preset communication range and the success rate that the data screening request is responded to are calculated. Based on the delay and the success rate that the data screening request is responded to, each content object contained in the cached content library of the target vehicle, and the cache ratio of the cached content library of the target vehicle, target content objects that match the data screening request are searched in the cached content library. Then the utility that the data screening request is responded to by the target vehicle is calculated and obtained, that is, the utility that each target vehicle responds to each data screening request is obtained. Then step C is performed.

Step C: For each target vehicle, based on the utility that the corresponding data screening request is responded to by the target vehicle, each data screening request responded to by the target vehicle is optimally screened, and a set of data screening requests responded to by the target vehicle is obtained.

Figure 2:
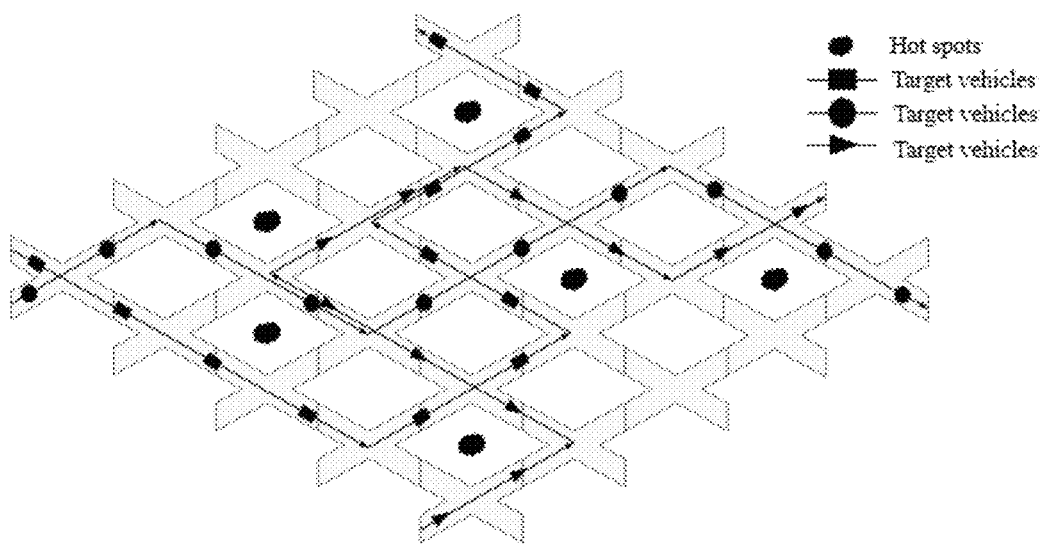
FIG. 2 shows a schematic diagram of a model of a system according to an exemplary example of the present disclosure.

Referring to FIG. 2, using the process in step A, based on the data eigenvalues of the specified preset data type of the content objects, each content object falls into the content category of each present type by means of self-organizing clustering. The set of data screening requests in the target region is $\{1, \ldots, j, \ldots, J\}$, the set of target vehicles is $\{1, \ldots, b, \ldots, B\}$, and for each content object c contained in the cached content library of each target vehicle, the data eigenvalues of Z data types corresponding to each content object c may be expressed as $tr_c=[tr_{c,1}, tr_{c,2}, \ldots, tr_{c,z}, \ldots, tr_{c,Z}]$, and $tr_{c,z}$ represents the data eigenvalue of the zth data type of the content object c.

Figure 3:
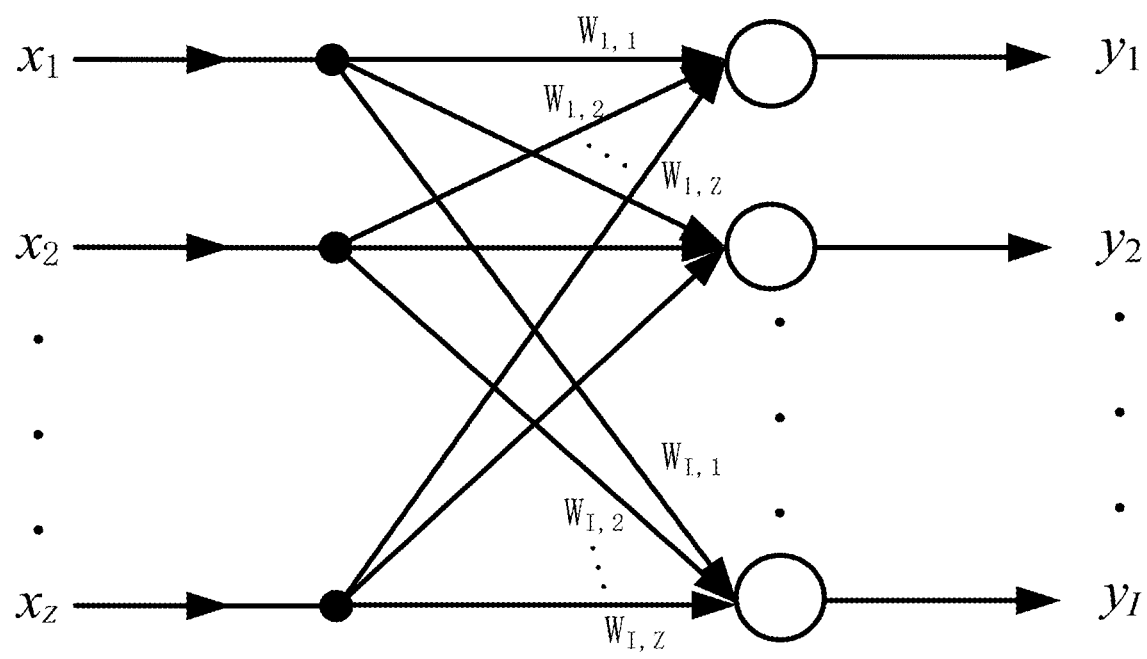
FIG. 3 shows a schematic structural diagram of a neural network according to an exemplary example of the present disclosure.

Content categorization is achieved by a neural network. With reference to FIG. 3, I content categories correspond to I neurons of a single-layer neural network, and correspond to I central samples. Z connection weights of the neurons correspond to the data eigenvalues of the central samples. The neural network includes Z input ports corresponding to Z eigenvalues of the content objects, and the neural network includes I output ports corresponding to I categories of the content objects. The output is $y=[y_1, y_2, \ldots, y_I]$, and the input and output may be expressed as $$y_i = \sum_{z=1}^{Z} W_{i,z}.$$

$tr_{c,z}$, $i=1, 2, \ldots, I$, where $W_i=[W_{i,1}, \ldots, W_{i,2}, \ldots, W_{i,Z}]$, $W_{i,z}$ represents the zth connection weight of the ith neuron, the maximum eigenvalue $y_i$ of y represents that the content c belongs to category i, $W_i$ is updated with $tr_c$, and the change of the connection weight $W_i$ is $\eta \cdot (tr_c - W_i)$, where $\eta$ is an adaptive constant.

Each target vehicle travels according to a preset route in a sub-target region. Assuming that the cache ratio of each target vehicle corresponding to I content categories is $r=[r_1, r_2, \ldots, r_I]$, the optimization problem is constructed by cross-entropy as follows:

$$\min_{[r_1, r_2, \ldots, r_I]} - \sum_{h \in H} \frac{1}{w_h} \cdot \sum_{i=1}^{I} p_{h,i} \cdot \log_2 r_i$$

where $$\min_{[r_1, r_2, \ldots, r_I]}$$

is the content category with the smallest cache ratio in the target vehicle, $w_h$ is the weight of distribution of a data screening request in the hth sub-target region in H sub-target regions, $p_{h,i}$ is the regional popularity corresponding to the ith content category contained in the target vehicle in the hth sub-target region, $r_i$ is the cache ratio of the ith content category in the target vehicle, i ranges from 1 to I, and the regional popularity is one data type of the specified preset data types.

The corresponding constraints of the optimization problem are:

s.t.

$$\sum_{i=1}^{I} r_i = 1 0 \leq r_i \leq 1$$

According to the constraints, the optimization problem is solved, and the cache ratio of each content category in each target vehicle is obtained.

By the process in step B, assuming that a data screening request j is to obtain a target content object l from a target vehicle b, and the average time that the target vehicle b transmits the content to the data screening request j is $$\frac{V}{R^{ave}},$$

when $T_{b,j} > t_j$, the delay is $$T_{b,j} - t_j + \frac{V}{R^{ave}},$$

and the service time of the vehicle is $$\left[T_{b,j}, T_{b,j} + \frac{V}{R^{ave}}\right];$$

when $$T_{b,j} < t_j \cap T_{b,j} + \frac{V}{R^{ave}} \geq t_j + \frac{V}{R^{ave}}, \text{ i.e., } t_j + \frac{V}{R^{ave}} - \frac{2R}{v} \leq T_{b,j} < t_j,$$

the delay is $$\frac{V}{R^{ave}},$$

and the service time of the vehicle is $$\left[t_j, t_j + \frac{V}{R^{ave}}\right];$$

when $$T_{b,j} < t_j \cap T_{b,j} + \frac{V}{R^{ave}} < t_j + \frac{V}{R^{ave}}, \text{ i.e., } T_{b,j} < t_j + \frac{V}{R^{ave}} - \frac{2R}{v},$$

the delay is $$T_{b,j} - 2t_j - \frac{R}{v} + T^{inter} + \frac{V}{R^{ave}},$$

and the service time of the vehicle is $$\left[T_{b,j} - 2t_j - \frac{R}{v} + T^{inter}, T_{b,j} - 2t_j - \frac{R}{v} + T^{inter} + \frac{V}{R^{ave}}\right],$$

where $T^{inter}$ represents the departure interval between the target vehicles; and then the delay $D_{b,j}$ that the data screening request j obtains the content l from the target vehicle b is:

$$D_{b,j} = \begin{cases} T_{b,j} - t_j + \frac{V}{R^{ave}}, & T_{b,j} > t_j \\ \frac{V}{R^{ave}}, & t_j + \frac{V}{R^{ave}} - \frac{2R}{v} \leq T_{b,j} < t_j \\ T_{b,j} - 2t_j - \frac{R}{v} + T^{inter} + \frac{V}{R^{ave}}, & T_{b,j} < t_j + \frac{V}{R^{ave}} - \frac{2R}{v} \end{cases}$$

The time $t_b$ that the target vehicle b arrives a certain sub-target region po obeys normal distribution, and the probability density function $f(t_b)$ of $t_b$ is:

$$f(t_b) = \frac{1}{\sqrt{2\pi\delta_{po}^2}} \exp\left(-\frac{(t_b - \mu_{po})^2}{2\delta_{po}^2}\right)$$

where $\mu_{po}$ is the mathematical expectation of $t_b$, and $\delta^2_{po}$ is the variance of $t_b$. The probability density function reflects the actual situation of the delay and the success rate that the data screening request is responded to in the sub-target region.

The distance of a preset communication range of the target vehicle is R, the rate at which the target vehicle transmits the content is $R^{ave}$, and the average travel speed of the target vehicle is v. Assuming that the times when the target vehicle b arrives and leaves the preset communication range are $T_{b,j}$ and $$T_{b,j} + \frac{2R}{v}$$

respectively, the conditions for the target vehicle b to enter the user's communication range within a tolerance time range of a user j are: when $t_j < T_{b,j}$, the condition for the target vehicle b to successfully transmit the content object l is $T_{b,j} < t_j + T$ and $$\frac{2R}{v} \geq \frac{V}{R^{ave}};$$

when $$T_{b,j} < t_j < T_{b,j} + \frac{2R}{v},$$

the condition fore the target vehicle b to successfully transmit the content object l is $$T_{b,j} + \frac{2R}{v} - t_j \geq \frac{V}{R^{ave}};$$

and when $$t_j > T_{b,j} + \frac{2R}{v},$$

the target vehicle b cannot successfully transmit the content object l. Then from formula (2), the probability $F_{b,j}$ that the target vehicle b successfully transmits the content is:

$$F_{b,j} = \begin{cases} \int_{t_j}^{t_j+T} f(t)dt \cdot q\left\{\frac{2R}{v} \geq \frac{V}{R^{ave}}\right\}, & t_j < T_{b,j} \\ \int_{t_j - \frac{2R}{v}}^{t_j} f(t)dt \cdot \int_{t_j + \frac{V}{R^{ave}} - \frac{2R}{v}}^{+\infty} f(t)dt, & T_{b,j} < t_j < T_{b,j} + \frac{2R}{v} \\ 0, & t_j > T_{b,j} + \frac{2R}{v} \end{cases}$$

The utility $U_{b,j}$ that the data screening request j is responded to by the target vehicle b is obtained:

$$U_{b,j} = \alpha \cdot F_{b,j} \cdot g_{b,c_j} + (1+\alpha)\frac{\frac{1}{D_{b,j}}}{\sum_{b=1}^{B} \frac{1}{D_{b,j}}}$$

where $\alpha$ is the proportional coefficient and $0 \leq \alpha \leq 1$, B is the total number of target vehicles contained in the target region, and $g_{b,c_j}$ is the probability that the target vehicle b obtains the target content object $c_j$ corresponding to the data screening request j, $$g_{b,c_j} = \begin{cases} \dfrac{c_j \cdot T_{b,k_\tau}}{N_{k_\tau}}, & c \cdot r_{b,k_\tau} < N_{k_\tau} \\ 1, & N_{k_\tau} \geq c \cdot r_{b,k_\tau} \end{cases}$$

where $k_\tau$ is the content category of the target content object $\tau$, $r_b$ is the cache ratio corresponding to each content category contained in the target vehicle b, $1 \leq k_\tau \leq I$, and $N_{k_\tau}$ is the number of content objects contained in the content category $k_\tau$.

By the process in step C, the optimization problem is solved, a set of data screening requests responded to by the target vehicle b is obtained, $b \in [1, B]$, and the set of data screening requests is stored in a content library as historical data for a new round of data screening requests, such that the amount of calculation of a system is reduced and the success rate of requests is further improved.

What is claimed is:

1. A content delivery method through an in-vehicle network, applied on the in-vehicle network of the target vehicle and a client of the target user in a target region, comprising
based on an interaction between the target vehicle and other target vehicles within a preset communication range, calculating a delay that the target vehicle responds to the target user within the preset communication range and a success rate that the target user is responded to;
based on the delay and the success rate that the target user is responded to, each content object contained in a cached content library of the target vehicle, and a cache ratio of the cached content library of the target vehicle, searching target content objects that match the target user in the cached content library; determining an utility that the target user is responded to by the target vehicle; and
based on the utility that the target user is responded to by the target vehicle, optimally screening the target user responded to by the target vehicle, and establishing a set of target users responded to by the target vehicle;
wherein the content objects contained in the cached content library of the target vehicle are determined by following method:
extracting a data eigenvalue of a specified preset data type of each content object in the content library corresponding to the target region;
based on the data eigenvalue of the specified preset data type of the content object, determining content objects that fall into the content category of each present type by means of self-organizing clustering;
based on the content category and the data eigenvalue of the content object, determining the content category corresponding to all content objects, and determining the cache ratio of all content objects corresponding to the target vehicle under each content category; and
inputting the content objects contained in each content category into the cached content library of the target vehicle.

2. The content delivery method through the in-vehicle network according to claim 1, wherein the target region further comprises multiple sub-target regions, and the determining the cache ratio of all content objects corresponding to the target vehicle under each content category comprises:
based on the data eigenvalue of the preset data type corresponding to each content object, assuming that the cache ratio of the target vehicle corresponding to I content categories is $r=[r_1, r_2, \ldots, r_I]$, the optimization problem is constructed by cross-entropy as follows:

$$\min_{[r_1, r_2, \ldots, r_I]} -\sum_{h \in H} \frac{1}{w_h} \cdot \sum_{i=1}^{I} p_{h,i} \cdot \log_2 r_i$$

where $$\min_{[r_1, r_2, \ldots, r_I]}$$

is the content category with the smallest cache ratio in the target vehicle, $w_h$ is the weight of distribution of a target user in the hth sub-target region in H sub-target regions, $p_{h,i}$ is a regional popularity corresponding to the ith content category contained in the target vehicle in the hth sub-target region, $r_i$ is the cache ratio of the ith content category in the target vehicle, and i ranges from 1 to I;
the corresponding constraints of the optimization problem are:

$$\text{s.t.} \sum_{i=1}^{I} r_i = 10 \leq r_i \leq 1$$

according to the constraints, the optimization problem is solved, and the cache ratio of each content category in each target vehicle is obtained.

3. The content delivery method through the in-vehicle network according to claim 1, wherein based on the interaction between the target vehicle and other target vehicles within the preset communication range, calculating the delay that the target vehicle responds to the target user within the preset communication range and the success rate that the target user is responded to, comprises:
determining the delay $D_{b,j}$ that the target user j is responded to by the target vehicle b, according to the following formula:

$$D_{b,j} = \begin{cases} T_{b,j} - t_j + \dfrac{V}{R^{ave}}, & T_{b,j} > t_j \\ \dfrac{V}{R^{ave}}, & t_j + \dfrac{V}{R^{ave}} - \dfrac{2R}{v} \leq T_{b,j} < t_j \\ T_{b,j} - 2t_j - \dfrac{R}{v} + T^{inter} + \dfrac{V}{R^{ave}}, & T_{b,j} < t_j + \dfrac{V}{R^{ave}} - \dfrac{2R}{v} \end{cases}$$

where $T_{b,j}$ is the time that the target vehicle b obtains the target user j within the preset communication range, V is an average size of the space occupied by the cached content library, v is in average driving speed of the target vehicle, R is p distance of the preset communication range of the target vehicle, $R^{ave}$ is a rate at which the target vehicle transmits the target content object, $t_j$ is tolerance time that the target user j is responded to by the target vehicle, and $T^{inter}$ is the time interval between the target vehicles;
determining the success rate $F_{b,j}$ that the target user j obtains the target content object from the cached content library corresponding to the target vehicle b, according to the following formula:

$$F_{b,j} = \begin{cases} \int_{t_j}^{t_j+T} f(t)dt \cdot q\left\{\frac{2R}{v} \geq \frac{V}{R^{ave}}\right\}, & t_j < T_{b,j} \\ \int_{t_j-\frac{2R}{v}}^{t_j} f(t)dt \cdot \int_{t_j+\frac{V}{R^{ave}}-\frac{2R}{v}}^{+\infty} f(t)dt, & T_{b,j} < t_j < T_{b,j} + \frac{2R}{v} \\ 0, & t_j > T_{b,j} + \frac{2R}{v} \end{cases}$$

where q is the probability, $$q\left\{\frac{2R}{v} \geq \frac{V}{R^{ave}}\right\}$$

represents 0 or 1, when $$\frac{2R}{v} \geq \frac{V}{R^{ave}}, q\left\{\frac{2R}{v} \geq \frac{V}{R^{ave}}\right\} = 1,$$

otherwise $$q\left\{\frac{2R}{v} \geq \frac{V}{R^{ave}}\right\} = 0;$$

determining the utility $U_{b,j}$ that the target user j is responded to by the target vehicle b, according to the following formula:

$$U_{b,j} = \alpha \cdot F_{b,j} \cdot g_{b,c_j} + (1+\alpha)\frac{\frac{1}{D_{b,j}}}{\sum_{b=1}^{B}\frac{1}{D_{b,j}}}$$

where α is g proportional coefficient, B is g total number of the target vehicles contained in the target region, and $g_{b,c_j}$ is a probability that the target vehicle b obtains the target content object $c_j$ corresponding to the target user j, $$g_{b,c_j} = \begin{cases} \frac{c_j \cdot r_{b,k_\tau}}{N_{k_\tau}} & c \cdot r_{b,k_\tau} < N_{k_\tau} \\ 1, & N_{k_\tau} \geq c \cdot r_{b,k_\tau} \end{cases}$$

where $k_\tau$ is the content category of the target content object τ, $r_b$ is the cache ratio corresponding to each content category contained in the target vehicle b, $1 \leq k_\tau \leq I$, and $N_{k_\tau}$ is the number of content objects contained in the content category $k_\tau$.

4. The content delivery method through the in-vehicle network according to claim 3, wherein the optimally screening the target user j responded to by the target vehicle, and constructing the optimization problem is as follows:

$$\max_{set_b, b\in\{1,2,\ldots,B\}} \sum_{b=1}^{B} \sum_{j\in set_b} U_{b,j}$$

where $set_b$ is a set of the target users j responded to by the target vehicle b, and the corresponding constraints of the optimization problem are:

$$\text{s.t.} \quad \begin{array}{l} set_{b1} \cap set_{b2} = \emptyset, b1 \neq b2, b1, b2 \in [1, B] \\ set_1 \cup set_2 \cup \ldots \cup set_j = \{1, 2, \ldots, j, \ldots, J\} \end{array}$$

where J is the total number of the target users j.

5. A content delivery system through an in-vehicle network, comprising:
one or more processors; and
a memory, configured to store operable instructions, the instructions, when executed by the one or more processors, causing the one or more processors to perform operations, and the operations comprising executing the content delivery method through the in-vehicle network according to claim 1.

6. A non-transitory computer-readable medium for storing software, wherein the software comprises instructions executable by one or more computers, and the instructions, when executed by the one or more computers, perform the content delivery method through the in-vehicle network according to claim 1.

* * * * *